United States Patent Office 3,028,334
Patented Apr. 3, 1962

3,028,334
LUBRICANTS RESISTANT TO ATOMIC
RADIATION
Ernest V. Wilson, Roselle, N.J., assignor to Esso Research
and Engineering Company, a corporation of Delaware
No Drawing. Filed Jan. 29, 1954, Ser. No. 407,159
5 Claims. (Cl. 252—18)

The present invention relates to improved lubricants which are resistant to the destructive effects of atomic radiation. More particularly, the invention is concerned with improved lubricating oils and greases which are more stable and which retain their lubricating effect for a longer period of time than conventional lubricants under the influence of neutron and gamma radiation. In brief compass, the invention pertains to lubricants containing substantial proportions of materials having high gamma ray absorption coefficients and large capture cross-sections for thermal, i.e. slow, neutrons.

Present developments in the use of atomic energy indicate that nuclear reactors are being designed at a rapidly increasing rate for use as power plants for ships, aircraft and other carriers as well as for the generation of steam and electric power. Such atomic power plants have many moving parts which require lubrication, the lubricant being exposed to neutron and/or gamma radiation.

For example, the nuclear reactor itself is equipped with a large number of lubricated hydraulic lifters and control valves which are directly exposed to neutron as well as gamma radiation. The heat transfer fluid, usually a liquid metal, used to control the reactor temperature becomes radioactive in the atomic pile. The gamma radiation emitted by this fluid penetrates its piping and various other plant equipment and reaches lubricants used in various parts of the plant, particularly in relatively compact units as they are required in submarines or aircraft. A successful application of the nuclear reactor to this type of power generation and transmission requires, therefore, lubricants which retain their lubricating effect under the influence of neutron and gamma radiation.

Conventional lubricants rapidly fail under these conditions. It is well known in the art that organic matter undergoes severe decomposition by destructive dehydrogenation, charring, carbonization, etc. when subjected to neutron irradiation. Gamma radiation strongly promotes such reactions as cracking, polymerization, desulfurization, decarboxylation, alkylation, dehydrogenation, and similar reactions which may take place in conventional mineral oil base and most synthetic lubricants resulting in a rapid reduction or even complete destruction of the lubricating effect of the lubricant used. The present invention greatly alleviates this difficulty.

It has now been found that lubricants of greatly improved utility in the lubrication of atomic power equipment are obtained by incorporating into a lubricant base substantial proportions of a material having a high gamma ray absorption coefficient, which may be called a moderator, and substantial proportions of a material having a large capture cross-section for slow neutrons, which may be called an absorber material.

Materials which may be used in accordance with the invention as moderators to reduce the damaging effect of gamma radiation must be capable of decreasing the energy content of the gamma rays by providing a high frequency of collisions between gamma rays and electrons. Such collisions result in a finite proportion of the gamma ray energy being absorbed by the electron and in a corresponding reduction of the effect of gamma radiation on the environment of the moderator. This energy absorption is a function of the so-called "gamma ray absorption coefficient" of the moderator, which in turn is determined by the molecular weight and density of the material. The gamma ray absorption coefficient of a moderator is the greater the higher its molecular weight and/or the greater its density. Also, certain morphological aspects affect the gamma ray absorption coefficient and with it the utility of a material as moderator. For example, materials having a hexagonal close-packed or laminar structure, such as lead or graphite, are more suitable than materials of similar molecular weight and/or density but with different structural arrangements, such as cubic or monoclinic.

Quite generally, materials having a gamma ray absorption coefficient of at least 3 and preferably at least 5 are suitable for the purposes of the invention. The most outstanding examples of such materials are heavy metals, such as titanium, molybdenum, mercury, lead, bismuth, thorium, platinum, etc. These metals may be added to conventional lubricants in powdered form as metals, metal oxides or metal sulfides or in the form of compounds soluble in the base oil of the lubricant, for example as naphthenates, stearates, sulfonates, chelates, organic thio-phosphorus acid salts, phosphines, etc. Other suitable moderators include powdered graphite and various other powdered minerals which exhibit laminar structure, such as mica, asbestos, talc and the like. The active moderators should be present in the lubricants in proportions of about 2–30 wt. percent, preferably about 5–20 wt. percent, depending on the gamma ray absorption coefficient of the moderator and the moderating effect desired.

The material used as the slow neutron absorber should have a capture cross-section for thermal neutrons of at least 2,500 barns and should, after neutron bombardment, revert to form stable non-radioactive isotopes of at least the same minimum capture cross-section by releasing the absorbed energy in the form of harmless electromagnetic radiation. Data on neutron cross-sections of most elements and the stability of their isotopes are now available in the literature permitting the selection of materials suitable for the purposes of the present invention. Typical representatives of this class of materials are the elements cadmium, samarium and gadolinium. The pertinent characteristics of these elements are summarized in the table below.

| Element | Average Cross-Section (Barns) | Principal Isotopes for Neutron Absorption | Cross-Section (Barns) |
|---|---|---|---|
| Gadolinium, 156.9 Atomic Wt | 36,000 | $Gd^{155}$ $Gd^{157}$ | 50,000 180,000 |
| Samarium, 150.43 Atomic Wt | 8,000 | $Sm^{149}$ | 46,000 |
| Cadmium, 112.41 Atomic Wt | 2,900 | $Cd^{113}$ | 24,000 |

These neutron absorbers may be added to lubricants in the form of the finely divided metals, their oxides, sulfides, phosphides, phosphorus acid salts, etc. or as compounds soluble in the base oil of the lubricant, such as the naphthenates, petroleum sulfonates, fatty acid soaps, e.g. stearates, oleates, etc., complexes of such soaps with the metal salts of low molecular weight carboxylic acids; chelates; porphyrines, etc. These materials selectively absorb the neutrons emitted by the reactor, which thus are prevented from causing decomposition of the lubricant and since only stable isotopes are formed no damaging secondary radiation is created.

The degree of protection afforded by each individual neutron absorber is, of course, a function of its concentration in the lubricant as well as its specific capture cross-section. This is illustrated by the following tabulation of the neutron absorption by the preferred absorbers of the invention at varying concentrations in a lubricant film of 0.05 cm. thickness.

| Additive | Capture Cross-Section (Barns) | Concentration Weight Percent | Percent Neutron Absorption |
| --- | --- | --- | --- |
| Gadolinium | 36,000 | 50 | 100.0 |
| | | 10 | 99.6 |
| | | 1 | 42.5 |
| Samarium | 8,000 | 50 | 99.8 |
| | | 10 | 70.8 |
| | | 1 | 11.6 |
| Cadmium | 2,900 | 50 | 95.4 |
| | | 10 | 45.9 |

As indicated by the above table, effective absorber concentrations may vary between about 1 and 50 wt. percent of the lubricant, depending somewhat on the specific absorber used. Concentrations of about 10–40 wt. percent of effective material are usually preferred.

When oil-insoluble moderators or absorbers are used, these materials should be employed in finely divided form. Particle sizes of less than 100 microns are suitable, sizes of about 50–75 microns being preferred.

The lubricating oil base of the lubricants of the invention may be of either mineral or synthetic origin. These oils should have a viscosity of about 2 centistokes at 210° F. to about 60 centistokes at 210° F. While all types of mineral oils of lubricating grade have utility for the purposes of the invention, those obtained from predominantly naphthenic stocks are more desirable, acid treated naphthenic type mineral lubricating oils being preferred. Of the synthetic oils, non-ester types are preferred. Suitable synthetic oils include Fischer synthesis products, hydrocarbon polymers, formals, acetals, glycols, ethers, glycol and polyglycol ethers, carbonates, silicanes, silicones, silicates, fluoro- and perfluoro carbons, of lubricating grade, all of which are well known in the art.

Greases in accordance with the invention may be prepared from the above-mentioned lubricating oils by adding a moderator and/or absorber of the type described and incorporating a conventional grease thickener in grease-making proportions of, say, about 3–50 wt. percent, preferably 10–30 wt. percent, based on total lubricant, the oil base forming about 20–95 wt. percent of the finished grease. Quite generally, non-soap type grease thickeners are preferred because of their greater stability toward gamma radiation. Essentially inorganic thickeners, such as carbon black, finely divided silica, silica gel, various metal silicates, including calcium silicate, bentonites, Bentones, Attapulgus clays, various gel-forming amphoteric metal oxides including $Al_2O_3$, $Fe_2O_3$, $Bi_2O_3$, $SnO_2$, are most desirable.

Examples of suitable soap-type thickeners include the hydrocarbon sulfonates of alkali metals, particularly sodium, potassium and lithium, alkaline earth metals, particularly calcium, strontium, barium and magnesium, aluminum and certain heavy metals, such as lead; having about 8–34 carbon atoms, particularly in combination with metal salts of low molecular weight carboxylic acids having 1–5 carbon atoms per molecule. Of the carboxylic acid soaps of the metals listed above, only those of essentially saturated fatty acids having 12–30 carbon atoms, e.g. stearic, palmitic, hydroxystearic, hydrogenated fish oil acids, should be used, preferably in the form of complexes with the metal salts of low molecular weight saturated carboxylic acids having 1–5 carbon atoms. Other suitable organic thickeners include various amino phenol derivatives, such as N-stearoyl-p-amino phenol, urea adducts, such as p-substituted arylureido derivatives of benzene and biphenyl, etc. All these thickeners are well known in the art.

Whenever a metal soap and/or salt type of thickener is used, at least a portion of the metal constituent may be supplied in the form of the metal base of the moderator and/or absorber of the invention. For example, cadmium stearate, calcium stearate-cadmium acetate complexes etc. may be used for this purpose.

Conventional methods of grease-making may be employed in preparing the greases of the invention. When using inorganic thickeners, the finely divided thickener may be dispersed in the oil base by means of homogenizers, colloid mills or similar high efficiency mixing equipment. This can be done prior to the incorporation of the moderator and/or absorber or in their presence. The latter method is preferred.

Soap-thickened greases may be made by saponifying suitable fats or oils containing the acids previously described, or by neutralizing the acids as such in at least a portion of the base oil with the metal bases mentioned above. When the metal base of the thickener is different from that of the moderator and/or absorber, the saponification is preferably carried out prior to the incorporation of the moderator and/or absorber. When the metal base of the thickener is the same as that of the moderator and/or absorber, the metal base of the moderator and/or absorber may be used as the saponifying or neutralizing agent. Grease-making conditions are those conventionally used including saponification temperatures of about 150°–250° F., dehydration temperatures of about 210°–300° F. and complexing or finishing temperatures of about 400°–600° F. In case the moderator and/or absorber is different from the metal base of the grease thickener, it is preferably added under agitation during the cooling cycle of the grease-making process at temperatures below about 350° F. The usual finishing steps, such as homogenization, milling, etc., may be employed.

The lubricants of the invention may contain minor proportions of conventional modifying agents, such as anti-oxidants, e.g. phenyl, α-naphthylamine; corrosion inhibitors, e.g. sorbitan mono-oleate, calcium sulfonate; extreme pressure agents, e.g. tricresyl phosphate, sulfurized and $P_2S_5$-treated materials, chlorinated hydrocarbons and esters; viscosity index improvers, e.g. polybutenes, polymethacrylates, etc.; pour point depressors, e.g. chlorowax alkylated naphthalenes, lauryl fumarate-vinyl acetate copolymers, etc.; tackiness and stringiness agents, e.g. polyisobutylenes, etc.

The invention will be further illustrated by the following specific examples.

*Example I*

A grease useful for the purposes of the invention may be prepared from the following components:

| Component: | Wt. percent |
| --- | --- |
| Cadmium stearate | 20 |
| Cadmium acetate | 20 |
| Molybdenum disulfide powder | 10 |
| Phenyl alpha-naphthylamine | 0.5 |
| Formal of $C_{13}$-Oxo alcohol having a viscosity of 3.4 centistokes at 210° F | 49.5 |

The grease is prepared as follows: About ⅓ of the formal is mixed with the stearic acid and heated to about 150° F. Cadmium hydroxide is added sufficient to neutralize the stearic acid. Thereafter glacial acetic acid is added and neutralized with additional cadmium hydroxide. The mixture is heated to about 220° F. until dehydration is complete. Heating is continued at a rapid rate until a temperatrue of about 450° F. is reached. The grease is then allowed to cool and the remaining portion of the formal is added at a temperature of about 300° F. After further cooling, the molybdenum disulfide powder and the oxidation inhibitor are added and the grease is passed through a homogenizer at a temperature of about 180°–200° F.

Example II

Another suitable grease has the following formula:

| Component: | Wt. percent |
|---|---|
| Acetylene carbon black | 8 |
| Samarium oxide ($Sm_2O_3$) | 10 |
| Aluminum stearate | 3 |
| Phenyl alpha-naphthylamine | 0.5 |
| Coastal distillate of 50 SSU at 210° F | 78.5 |

The grease is prepared as follows: Preformed aluminum stearate is dissolved in a portion of the base oil and heated to about 250° F. The remaining oil is added and the mixture is allowed to cool. During the cooling stage the carbon black is stirred in, followed by the samarium oxide and the oxidation inhibitor. The grease is then finished by milling at temperatures of about 150°–200° F.

Example III

A lubricating oil in accordance with the invention may be prepared by intimately mixing the components given below, at substantially room temperature or slightly elevated temperatures promoting the solution of the additives in the oil base.

| Component: | Wt. percent |
|---|---|
| Gadolinium naphthenate | 6 |
| Bismuth stearate | 25 |
| Condensation product of salicyl aldehyde and propylene diamine | 1 |
| Phenyl alpha-naphthylamine | 0.5 |
| Coastal distillate of 30–40 SSU at 210° F | 67.5 |

Example IV

Another lubricating oil of good radiation stability is obtained by mixing the following components substantially as described in Example III.

| Component: | Wt. percent |
|---|---|
| Gadolinium oleate | 5 |
| Mercury naphthenate | 30 |
| Phenyl alpha-naphthylamine | 0.5 |
| Condensation product of salicyl aldehyde and propylene diamine | 1 |
| Polyethylene glycol of about 200 molecular weight | 64.5 |

The present invention is not limited to the specific examples set forth above. The relative proportions of the lubricant constituents may be varied within the limits indicated to obtain lubricants of different characteristics.

What is claimed is:

1. A lubricant of improved stability toward atomic radiation which comprises about 20%–95% by weight of a lubricating oil having a viscosity of about 2–60 centistokes at 210° F. selected from the group consisting of mineral oils, and synthetic oils, a moderator component selected from the group consisting of metals and compounds thereof selected from the group consisting of titanium, molybdenum, mercury, lead, bismuth, thorium and platinum, the metal being present in said lubricant in the amount of about 2%–30% by weight based on the weight of said lubricant and an absorber component selected from the group consisting of metals and compounds thereof selected from the group consisting of cadmium, samarium and gadolinium the metal being present in said lubricant in the amount of about 1%–50% by weight based on the weight of said lubricant.

2. A lubricant in accordance with claim 1 containing as an additional component in the range of from 3% to 50% by weight based on the weight of said lubricant of a grease thickener selected from the group consisting of inorganic grease thickeners and soap-type grease thickeners.

3. A lubricant of improved stability toward atomic radiation which comprises 67.5 wt. percent of a mineral oil having a viscosity in the range between about 30–40 S.S.U. at 210° F., 25 wt. percent of bismuth stearate and 6 wt. percent of gadolinium naphthenate.

4. A lubricant of improved stability toward atomic radiation which comprises 64.5 wt. percent of polyethylene glycol having a molecular weight of about 200, 30 wt. percent of mercury naphthenate and 5 wt. percent of gadolinium oleate.

5. A lubricant of improved stability toward atomic radiation which comprises about 78.5 wt. percent of a mineral oil having a viscosity of 50 S.S.U. at 210° F., about 8 wt. percent of acetylene carbon black, about 10 wt. percent of samarium oxide and about 3 wt. percent of aluminum stearate.

References Cited in the file of this patent

UNITED STATES PATENTS

| 2,065,247 | Smith | Dec. 22, 1936 |
|---|---|---|
| 2,156,803 | Cooper et al. | May 2, 1939 |
| 2,195,669 | Cavanaugh | Apr. 2, 1940 |
| 2,285,453 | Merkle | June 9, 1942 |
| 2,285,739 | Merkle | June 9, 1942 |
| 2,421,543 | Cook | June 3, 1947 |
| 2,543,741 | Zweifel et al. | Feb. 27, 1951 |

FOREIGN PATENTS

| 327,097 | Great Britain | Mar. 24, 1930 |
|---|---|---|

OTHER REFERENCES

Materials, by Geo. Evans, pages 18–25, Nucleonics, June 1953, vol. 11, No. 6, McGraw-Hill, N.Y.